United States Patent
Strey et al.

(10) Patent No.: US 8,875,666 B2
(45) Date of Patent: Nov. 4, 2014

(54) METHOD FOR THE IN SITU PRODUCTION OF FUEL/WATER MIXTURES IN COMBUSTION ENGINES

(75) Inventors: Reinhard Strey, Dormagen (DE); Lada Bemert, Solingen (DE); Christof Simon, Trierweiler (DE); Heinrich Doerksen, Mertesdorf (DE)

(73) Assignees: Universitaet zu Koeln, Cologne (DE); Fachhochschule Trier, Trier (DE)

( * ) Notice: Subject to any disclaimer, the term of this patent is extended or adjusted under 35 U.S.C. 154(b) by 0 days.

(21) Appl. No.: 13/498,976

(22) PCT Filed: Oct. 5, 2010

(86) PCT No.: PCT/EP2010/064821
§ 371 (c)(1),
(2), (4) Date: Mar. 29, 2012

(87) PCT Pub. No.: WO2011/042432
PCT Pub. Date: Apr. 14, 2011

(65) Prior Publication Data
US 2012/0180741 A1    Jul. 19, 2012

(30) Foreign Application Priority Data
Oct. 5, 2009    (DE) .......................... 10 2009 048 223

(51) Int. Cl.
| | | |
|---|---|---|
| *F23K 5/10* | (2006.01) |
| *F02D 19/12* | (2006.01) |
| *F23K 5/12* | (2006.01) |
| *C10L 1/32* | (2006.01) |
| *F02M 25/022* | (2006.01) |

(52) U.S. Cl.
CPC ................. *C10L 1/328* (2013.01); *F02D 19/12* (2013.01); *F23K 5/12* (2013.01); *Y02T 10/121* (2013.01); *F02M 25/0228* (2013.01)
USPC ......... 123/25 R; 123/25 E; 123/575; 123/304

(58) Field of Classification Search
CPC .... F02M 25/0228; F02M 21/02; F02B 13/00; F02B 3/06; F02B 43/04; F02B 47/02; F02D 19/0684; F23K 5/12; B01F 3/0807; B01F 2215/0088; B22F 7/08; C04B 2235/3225; C04B 2235/3481; C04B 2235/36; C04B 2235/5445; C04B 2235/6025; C04B 35/195
USPC ........... 123/25 R–25 F, 575–578, 304, 195 A, 123/198 C, 198 R, 468; 44/301
See application file for complete search history.

(56) References Cited

U.S. PATENT DOCUMENTS

| | | |
|---|---|---|
| 3,876,391 A | 4/1975 | McCoy et al. |
| 4,158,551 A | 6/1979 | Feuerman |

(Continued)

FOREIGN PATENT DOCUMENTS

| | | |
|---|---|---|
| CA | 1 137 751 A1 | 12/1982 |
| CA | 2 048 906 C | 3/1992 |

(Continued)

OTHER PUBLICATIONS

J. Warnatz et al.: "Verbrennung", Springer, pp. 280-291 (2001).

(Continued)

*Primary Examiner* — Lindsay Low
*Assistant Examiner* — Tea Holbrook
(74) *Attorney, Agent, or Firm* — Norman B. Thot

(57) ABSTRACT

A process for operating an internal combustion engine or a nozzle includes producing a fuel mixture in-situ. The fuel mixture consists of a polar component A, a nonpolar fuel component B, an amphiphilic component C, and an auxiliary component D. The fuel mixture is produced in a high-pressure region of an injection system of an internal combustion engine or of a nozzle within 10 seconds of an injection operation. The fuel mixture is injected into the internal combustion engine or the nozzle. A pressure is in a range of from 100 to 4,000 bar.

22 Claims, 15 Drawing Sheets

(56) References Cited

U.S. PATENT DOCUMENTS

| | | | |
|---|---|---|---|
| 4,244,702 A | | 1/1981 | Alliger |
| 4,295,859 A | | 10/1981 | Boehmke |
| 4,297,107 A | | 10/1981 | Boehmke |
| 4,451,265 A | | 5/1984 | Schwab |
| 4,451,267 A | | 5/1984 | Schwab et al. |
| 4,465,494 A | | 8/1984 | Bourrel et al. |
| 4,526,586 A | | 7/1985 | Schwab et al. |
| 4,554,903 A | * | 11/1985 | Straubel et al. ............... 123/575 |
| 4,557,734 A | | 12/1985 | Schwab et al. |
| 4,599,088 A | | 7/1986 | Davis et al. |
| 4,744,796 A | | 5/1988 | Hazbun et al. |
| 4,831,970 A | | 5/1989 | Caputo |
| 4,938,606 A | * | 7/1990 | Kunz ............................ 366/134 |
| 5,104,418 A | | 4/1992 | Genova et al. |
| 5,259,851 A | * | 11/1993 | Genova et al. ................. 44/302 |
| 6,190,427 B1 | | 2/2001 | Ahmed |
| 7,523,739 B2 | * | 4/2009 | Kaneko ......................... 123/381 |
| 2001/0015030 A1 | | 8/2001 | Wenzel |
| 2002/0129541 A1 | | 9/2002 | Daly et al. |
| 2003/0024852 A1 | * | 2/2003 | Huffer et al. .................... 208/15 |
| 2003/0134755 A1 | | 7/2003 | Martin |
| 2004/0055210 A1 | | 3/2004 | Lif et al. |
| 2004/0255509 A1 | | 12/2004 | Jakush et al. |
| 2005/0126513 A1 | * | 6/2005 | Hendren ....................... 123/1 A |
| 2007/0028507 A1 | * | 2/2007 | Strey et al. ..................... 44/301 |
| 2007/0113831 A1 | * | 5/2007 | Hoke et al. .................... 123/519 |
| 2007/0119391 A1 | * | 5/2007 | Fried et al. .................... 123/25 A |
| 2007/0119416 A1 | * | 5/2007 | Boyarski ....................... 123/304 |
| 2007/0131180 A1 | * | 6/2007 | Roehm ......................... 123/25 A |
| 2008/0092859 A1 | * | 4/2008 | Little, III ...................... 123/557 |
| 2008/0115759 A1 | * | 5/2008 | Russell ....................... 123/198 F |
| 2008/0250701 A1 | | 10/2008 | Van De Berg et al. |
| 2009/0065409 A1 | * | 3/2009 | Kamio et al. ................. 210/123 |
| 2009/0107555 A1 | * | 4/2009 | Aradi .............................. 137/13 |
| 2009/0178642 A1 | * | 7/2009 | Huang ......................... 123/25 D |
| 2009/0300969 A1 | | 12/2009 | Martin |
| 2011/0061622 A1 | * | 3/2011 | Lund ............................. 123/1 A |

FOREIGN PATENT DOCUMENTS

| | | | | |
|---|---|---|---|---|
| DE | 43 07 943 A1 | | 9/1994 | |
| DE | 196 09 800 C1 | | 11/1996 | |
| DE | 199 17 156 A1 | | 10/2000 | |
| DE | 10334897 A1 | | 3/2005 | |
| EP | 0012292 A1 | | 6/1980 | |
| EP | 0 285 190 A1 | | 10/1988 | |
| EP | 0 956 896 A1 | | 11/1999 | |
| FR | 2872550 | * | 1/2006 | |
| GB | 2 434 372 A | | 7/2007 | |
| MX | 9604555 A | | 2/1998 | |
| MX | PA 03 005 242 A | | 5/2004 | |
| NZ | 506 262 A | | 10/2003 | |
| RU | 2 217 479 C2 | | 11/2003 | |
| WO | WO 0062914 A1 | * | 10/2000 | ............... B01F 3/08 |
| WO | WO 2005/012466 A1 | | 2/2005 | |
| WO | WO 2007/063036 A2 | | 6/2007 | |

OTHER PUBLICATIONS

F. Bedford et al.: "Effects of Direct Water Injection on DI Diesel Engine Combustion", SAE Technical Papers, pp. 1-10 (2000).

H. Doerksen et al.: "Vorgelagerte Kraftstoffmenge bei geschichteter Diesel-Wasser-Einspritzung", MTZ, pp. 58-64 (2007).

C. Simon et al.: "Einfluβ der geschichteten Wassereinspritzung auf das Abgas-und Verbrauchsverhalten eines Dieselmotors mit Direkteinspritzung", MTZ, pp. 49-55 (2004).

F. Barnaud et al.: "Aquazole™: An Original Emulsified Water-Diesel Fuel for Heavy-Duty Applications", SAE Technical Paper Series, pp. 1-9 (2000).

A. C. Matheaus et al.: "Effects of PuriNOx™ Water-Diesel Fuel Emulsions on Emissions and Fuel Economy in a Heavy-Duty Diesel Engine", Society of Automotive Engineers, pp. 1-11 (2004).

M. Kahlweit et al.: "General Patterns of the Phase Behavior of Mixtures of $H_2O$, Nonpolar-Solvents, Amphiphiles, and Electrolytes. 2", Langmuir, vol. 5, pp. 305-315 (1989).

* cited by examiner

METHOD FOR THE IN SITU PRODUCTION OF FUEL/WATER MIXTURES IN COMBUSTION ENGINES

CROSS REFERENCE TO PRIOR APPLICATIONS

This application is a U.S. National Phase application under 35 U.S.C. §371 of International Application No. PCT/EP2010/064821, filed on Oct. 5, 2010 and which claims benefit to German Patent Application No. 10 2009 048 223.7, filed on Oct. 5, 2009. The International Application was published in German on Apr. 14, 2011 as WO 2011/042432 A1 under PCT Article 21(2).

FIELD

The present invention provies a process for the in-situ production of fuel mixtures such as fuel/water mixtures, for example, (micro-/nano-)emulsions in internal combustion engines, and to suitable additive mixtures therefor and to specific fuel mixtures produced by this process.

BACKGROUND

Pollutant formation in the combustion of fossil and biogenic fuels is a problem yet to be solved. In the ideal case of complete combustion, hydrocarbon compounds $C_xH_y$ are converted to carbon dioxide $CO_2$ and water vapor $H_2O$. Under real conditions, depending on the temperatures and pressures existing in the combustion chamber, fuel molecules and air, which consists for the most part of nitrogen and oxygen, form soot particles, nitrogen oxides, uncombusted hydrocarbons and carbon monoxide. Some of these emissions can be reduced by varying the internal engine parameters (exhaust gas recycling, injection time, duration and pressure, combustion chamber geometry, etc.). All internal engine measures for the reduction of pollutant emission result in a conflict of aims, which is referred to as the soot-$NO_x$ trade-off. When the combustion temperature is lowered, a lower level of nitrogen oxides is formed. In contrast, an increased amount of soot forms at low temperatures during combustion. In order to fulfill the exhaust gas standards for diesel engines, exhaust gas after-treatment technologies are additionally required, for example, SCR catalyst and diesel particulate filter. If water is added to the combustion process, the emissions of the nitrogen oxides and of the soot are reduced at the same time, and the soot-$NO_x$ trade-off is eliminated. Due to the high enthalpy of vaporization of water and the resulting lower combustion temperature, the formation of thermal NO, called Zeldovich NO, is reduced (Warnatz, J. et al., Verbrennung, Springer, Berlin (2001)). Since thermal NO makes up the greatest proportion of the nitrogen oxides in percentage terms, water addition can minimize nitrogen oxide emissions. At high temperatures (>2000 K), water molecules in the combustion chamber form considerable concentrations of free radicals (.OH, .O, .O$_2$H) which, in the free-radical chain branching reaction, accelerate the degradation of hydrocarbon chains (Warnatz, J. et al., Verbrennung, Springer, Berlin (2001)).

The water can be supplied by various routes, for example, in the form of direct injection into the combustion chamber (Bedford, F. et al., SAE Technical Papers, 2000-01-2938 (2000)). At FH Trier (Trier University of Applied Sciences), a method of stratified injection of the water has been developed in which water is added through an additional channel alongside the fuel line in the injection nozzle. As a result of the static pressure drop on opening of the needle during the injection operation, the water is placed immediately before the nozzle orifice, and thus diesel and water are injected alternately into the combustion chamber. Exhaust gas analyses show that the NO emissions can be reduced by more than 50% with a water content of 40% by volume according to the load state. Both the soot emissions and fuel consumption remain unchanged (Dorksen, H. et al., Vorgelagerte Kraftstoffinenge bei geschichteter Diesel-Wasser-Einspritzung, MTZ (2007); Simon, C. and Pauls, R., Einfluβ der geschichteten Wassereinspritzung auf das Abgas-und Verbrauchsverhalten eines Dieselmotors mit Direkteinspritzung, MTZ (2004)). The water injection into the charge air in spray form causes a moderate lowering of $NO_x$ emission (at 30% water, NO lowering approximately 20%), but also a slight rise in the smoke number. The water can also be introduced into the combustion chamber in the form of a water-containing fuel. Such fuels are already available as water-diesel emulsions (Schmelzle, P. et al., Aquazole: An Original Emulsified Water-Diesel Fuel for Heavy-Duty Applications, SAE Technical Papers, 2000-01-1861 (2000) or Mikroemulsionen (Nawrath, A. et al., Mikroemulsionen und deren Verwendung als Kraftstoff, DE10334897A1 (2003)). The use of the ready-mixed water-containing fuels relies on a constant water content, which can lead to worsened ignition performance when the engine is cold-started. In the low-load range, there is additionally an observation of increased emission of the uncombusted hydrocarbons and, at high loads, only a slight lowering in the soot and nitrogen oxides. It follows from our studies that the water content be varies as a function of the operating state of the engine in order that pollutant emissions are efficiently lowered and the specific fuel consumption reduced. In dynamically operated internal combustion engines, the change in load is so rapid that a newly-defined water-fuel mixture should be provided within a few crankshaft rotations. A further point relates to the quality of the mixture. The coarser the distribution of the water-fuel domains, the more soot is produced. Therefore, a further requirement is, within a very short time and with a minimum level of energy expenditure, to achieve ultrafine distribution of the water in the fuel.

As early as 1979, Feuerman formulated an emulsion of gasoline, water and nonionic surfactants, and thus achieved a reduction in the level of environmentally harmful exhaust gases on combustion (Feuerman, A. I., Gasoline-water emulsion, U.S. Pat. No. 4,158,551 (1979)). Boehmke (Bayer A G) in 1980 formulated opalescent gasoline and diesel emulsions which were stable up to temperatures of T=−15° C. and comprised carboxamides formed from biogenic and synthetic fatty acids and alcohols (Boehmke, G., Motor fuels and furnace oils, preparation thereof and their application, (DE), B.A., EP0012292 (1980)); two years later, in 1982, there followed fuel emulsions comprising a nonionic emulsifier formed from an addition product of ethylene oxide or propylene oxide onto a carboxamide having 9-21 carbon atoms in the hydrophobic chain (Boehmke, G., Aqueous Hydrocarbon Fuel Containing Alkylene Oxide-Carboxylic Acid Amide Emulsifier, AG, B., CA1137751 (1982)). Alliger in 1981 described a method for production of emulsifiers with bunker oil (Alliger, H., Emulsified fuel oil and method of production, U.S. Pat. No. 4,244,702 (1981)), which finds use as a fuel in shipping. Lubrizol marketed the diesel emulsion fuel Puri-NOx with 10 to 20% water for improvement of pollutant and energy balance (Matheaus, A. C. et al., Society of Automotive Engineers, PT-111 (Alternative Diesel Fuels): p. 1-11 (2004)). The company claims reduction in $NO_x$ emissions by 20 to 30% and in soot particulates by 50 to 65%. Bock et al. in 1992 mixed various fuels with water, short-chain and medium-chain alcohols with surfactant combinations of hydrophilic and hydrophobic surfactants (Bock, J., Robbins et al., Microemulsion Diesel Fuel Compositions and Method of Use, CA2048906 (1992)). With a quite different approach, Gunnerman in 1998 developed biphasic fuels with high water contents between 20 and 80% (Gunnerman, R., Aqueous Fuel for Internal Combustion Engine and Method of Preparing Same, MX9604555 (1998)), which were combusted in a technically complex manner in what are called "rotary engines". The advantage of these oil-in-water (o/w) emulsions lies in a low surfactant requirement below 1%, and in the lack of ignitability outside the combustion chamber. In spite of the technical difficulty of implementation, this fuel was used to operate buses in the USA. Genova et al. in 1992 stabilized diesel fuels with relatively low water contents by means of glycolipids and large proportions of medium-chain alcohols as cosurfactants (Genova, C. et al., Hybrid Diesel Fuel Composition, (IT), E.S., U.S. Pat. No. 5,104,418 (1992)). Subsequently, in 1993, they extended these water-containing diesel fuels to include further fuel types (Genova, C. and Pappa, R., Hybrid liquid fuel composition in aqueous microemulsion form, (IT), E.S., U.S. Pat. No. 5,259,851 (1993)). Aslachanov et al. (Aslachanov, A. A. et al., Fuel for internal combustion engines, (DE), A.O.W.H.G., DE4307943 (1994)) in 1993 produced stable, low-viscosity, highly dispersed (0.1 μm) emulsions of gasoline or diesel fuel with only one surfactant: quaternary ammonium salt of fatty acid amide ($C_{21}+C_{30}$). Test bed trials with gasoline emulsions showed a 5% improvement in economic viability, reduction in carbon monoxide emissions and nitrogen oxide emissions, and a higher octane number of the new fuel. Lubrizol in 2002 developed, on the basis of amine-neutralized acylation reagents and nonionic surfactants, stabilized emulsions with ammonium nitrate as a cetane number improver (Daly, D. T. et al., Emulsified water-blended fuel compositions, US2002129541 (2002)). David in 2002 described clear stable emulsions comprising emulsifier mixtures of alcohol ethoxylates, polyisobutylsuccinimides, sorbitan esters, amine ethoxylates, fatty acid amines with addition of ethylene glycol and butoxyethanol (Martin, D. W., Compositions and a method for their preparation, US 2003/134755 (2003)). Jakush et al. in 2004 formulated, for Clean Fuels Technology INC (USA), highly stable inverse water-diesel emulsions which were sold in Australia by Shell AG (Jakush, E. A. et al., Stabile invert fuel emulsion compositions and method of making, (US), C.F.T.I., US2004255509 (2004)). Van de Berg et al. in 2007 synthesized polymers based on the ester of succinic acid, which were supposed to find use inter alia as stabilizers for formulation of fuel emulsions (kerosene, gasoline, diesel, heating oil, RME). The polymer was used in combination with emulsifiers and stabilizing components. Biocides and short-chain alcohols were added to the aqueous phase (Van de Berg, A. et al., Surface-Active Polymer and its Use in a Water-in-Oil Emulsion, in WO 2007/063036 A22007, WO 2007/063036 A2). Microemulsions of gasoline, kerosene, diesel and heating oil with water-soluble octane number-improving and freezing point-depressing additives and surfactant mixtures formed from salts of fatty acids and polyalkanolamines, and also nonionic polyoxyalkylates with nonylphenols, fatty acid amides and sorbitan esters, were patented in 1971 by McCoy et al. (McCoy, F. and Eckert, G., Process of Preparing Novel Microemulsions, U.S. Pat. No. 3,876,391 (1975)). Bourrel et al. in 1982 developed fuels with low water and high alcohol contents (Bourrel, M. et al., Microemulsion of water in a liquid fuel, Elf, A. F., U.S. Pat. No. 4,465,494 (1982)), in which the ELF Aquitaine group was involved. The group later tested water-containing diesel emulsions in bus and truck fleets in several French cities such as Paris, Lyons and Chambery, and then in Berlin, and developed the Aquazole product for heavy goods vehicles to a market-ready state by 1999 (Schmelzle, P. et al., Aquazole: An Original Emulsified Water-Diesel Fuel for Heavy-Duty Applications, SAE Papers, 2000-01-1861 (2000)). Schwab in 1984 developed low-temperature-stable water-diesel microemulsions comprising a surfactant component formed from dimethylethanolamine and long-chain fatty acids (Schwab, A., Diesel fuel-aqueous alcohol microemulsions, (US), U.A., U.S. Pat. No. 4,451,265 (1984)), and in 1984 and 1985 alcohol- and water-containing vegetable oil microemulsions of different composition for engine combustion (Schwab, A. and Pryde, E., Microemulsions from vegetable oil and aqueous alcohol with trialkylamine surfactant as alternative fuel for diesel engines, (US), U.A., U.S. Pat. No. 4,451,267 (1984); Schwab, A. and Pryde, E., Microemulsions from vegetable oil and aqueous alcohol with 1-butanol surfactant as alternative fuel for diesel engines, (US), U.A., U.S. Pat. No. 4,526,586 (1985); Schwab, A. and Pryde, E., Microemulsions from vegetable oil and lower alcohol with octanol surfactant as alternative fuel for diesel engines, (US), U.A., U.S. Pat. No. 4,557, 734 (1985)). Hazbun et al. as early as 1986 developed fuel microemulsions with tert-butyl alcohol as the main component, small water contents of up to 7% by weight and methanol, using surfactant mixtures of ionic and nonionic surfactants (Hazbun, E. A. et al., Microemulsion fuel system, U.S. Pat. No. 4,744,796 (1988)). In 1986, Davis et al. filed a patent for clear, stable gasoline-based solutions comprising alcohols, nonylphenol ethoxylates and water with an improved octane number (Davis, M. and Sung, R., Clear Stable Gasoline-Alcohol-Water Motor Fuel Composition, Texaco Inc., W.P., N.Y., U.S. Pat. No. 4,599,088 (1986)). In New Zealand, Wenzel in 2003 developed combustion-improving microemulsion compositions with ionic surfactants formed from carboxylic acids, neutralized with ammonia or urea, and alcohol (Wenzel, D., Composition as an additive to create clear stable solutions and microemulsions with a combustible liquid fuel to improve combustion, NZ506262 (2003)). The solubilization of alcohols with residual water, with a water content in the overall mixture not exceeding 1.2% by weight, in the form of microemulsions was the primary aim of Akhmed (Akhmed, I., Composition of Diesel Fuel, RU2217479 (2003)) and Lif (Lif, A., A Microemulsion Fuel Containing a Hydrocarbon Fraction, Ethanol, Water and an Additive Comprising a Nitrogen-Containing Surfactant and an Alcohol, MXPA03005242 (2004)), which was achieved in the first case by addition of fatty alcohol ethoxylates and polymers, and in the second case with amine-containing surfactants. David in 2006 filed a patent for water-in-oil microemulsions comprising amphoteric surfactants, fatty acid amidoalkyl betaines, and cosurfactants such as alcohol ethoxylates, alkylamine oxides, ethoxylated fatty acid amines, which, due to the small water domain size (<0.1 μm), have inhibiting action on the growth of water organisms (Martin, D. W., Water-in-oil microemulsions, GB 2434372 (2007)).

All of the aforementioned have the aim of producing a water-containing fuel with a defined water content. The use of such a fuel in an internal combustion engine leads to inhomogeneous reduction of the pollutant emission as a function of the load state. For the efficient lowering of the soot and nitrogen oxide emissions, the water has to be metered in optimally at any operating point. This is possible only when the mixing site is positioned as close as possible to the injection nozzle. Thus, the reaction time until establishment of a new mixing ratio can be minimized. A further aspect is the distribution of the fuel and of the water in the fuel. The finer the distribution of the water, the lower the emission values.

SUMMARY

An aspect of the present invention was to provide mixtures which do not have the aforementioned disadvantages, and which consist of a polar component A, a nonpolar component B and an amphiphilic component C and an auxiliary component D, and which are mixed together no earlier than 10 seconds prior to injection into internal combustion engines or nozzles, i.e., close in spatial terms to the injection site, i.e., in the high-pressure part of the fuel system, and which provide ultrafine distribution of the fuel and water domains. A further aspect of the present invention was that these mixtures have rapid mixing kinetics at high pressures in the injection system, and be formulable with a variable water content. A variable water-fuel ratio is important for optimal combustion, and rapid mixing kinetics allow a rapid adjustment of the newly metered ultrafinely distributed mixture corresponding to the change in the load state of the engine. The hydrophobic components B used should be fuels in the widest sense. The choice of the amphiphilic component C and auxiliary component D should be ashlessly combustible, i.e., consist of elements C (carbon), H (hydrogen), O (oxygen) and N (nitrogen). The mixtures should be able to include any additive. The hydrophilic component A should be composed of water, mono- and polyhydric alcohols, peroxides and/or corresponding mixtures. An additional aspect of the present invention is to develop clean fuels optimized to the particular operating point of the engine, and the production thereof directly before the combustion operation in the high-pressure region of the injection system. These fuels, in relation to the hydrocarbon content provided, should be efficiently combustible and combustible completely with air. The exhaust gases formed should consist as far as possible only of water and carbon dioxide. The emissions of $NO_x$, CO, incompletely combusted hydrocarbons (HC) and soot particles should be suppressed as far as possible and the fuel consumption should be reduced. The exhaust gas aftertreatment tract should be simplified as far as possible by dispensing with some catalysts, or by being able to achieve a considerable reduction in dimensions thereof.

In an embodiment, the present invention provides a process for operating an internal combustion engine or a nozzle which includes producing a fuel mixture in-situ. The fuel mixture consists of a polar component A, a nonpolar fuel component B, an amphiphilic component C, and an auxiliary component D. The fuel mixture is produced in a high-pressure region of an injection system of an internal combustion engine or of a nozzle within 10 seconds of an injection operation. The fuel mixture is injected into the internal combustion engine or the nozzle. A pressure is in a range of from 100 to 4,000 bar.

BRIEF DESCRIPTION OF THE FIGURES

The present invention is described in greater detail below on the basis of embodiments and of the drawings in which.

DETAILED DESCRIPTION

Figure 1:
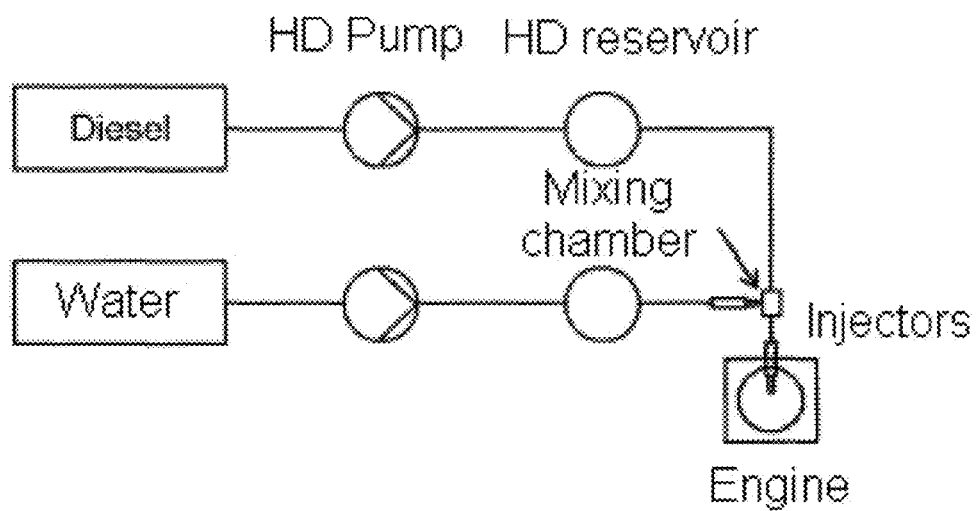
FIG. 1: shows a schematic diagram of high-pressure injection test bed.

In an embodiment of the present invention, mixtures of a polar component A, a nonpolar component B and an amphiphilic component C and an auxiliary component D have now been found, which can be produced in the high-pressure region of the injection system of an internal combustion engine and used as a fuel. These mixtures are mixed together no earlier than 10 seconds prior to injection into internal combustion engines or nozzles in the high-pressure part of the fuel system, and can be used as fuel. Due to the short mixing time, the water/fuel mixing ratio can be varied exactly according to the operating point as required, as a result of which an optimum with regard to pollutant emission, engine performance and consumption is achieved in any operating state. Exploiting the ultralow interfacial tension between water and fuel, which can be achieved by addition of specific surfactants/surfactant mixtures, ultrafine distribution of the water and fuel regions is achieved within a very short time. The consequence of this is that the water and fuel are present optimally alongside one another, and hence pollutant emissions of an internal combustion engine, especially soot and nitrogen oxides, can thus be eliminated efficiently. Depending on the surfactant molecule structure and/or concentration, an emulsion or microemulsion can be formed.

The present invention thus provides:

(1) a process for operating an internal combustion engine or a nozzle, comprising the in-situ production of a fuel mixture consisting of a polar component A, a nonpolar fuel component B and an amphiphilic component C and an auxiliary component D in the high-pressure region of the injection system of the internal combustion engine or of the nozzle no earlier than 10 seconds prior to the injection operation;

(2) an additive composition for in-situ production of a fuel mixture in the high-pressure region of the injection system of an internal combustion engine or of a nozzle, consisting of components (C) and (D) as defined in (1) above and optionally proportions of component (A) as defined in (1) above; and (3) specific fuel mixtures obtainable by a process as defined above under (1).

In an embodiment of the present invention, the hydrophobic component B used may be gasoline (any octane number), diesel, kerosene, biodiesel, Fischer-Tropsch diesel, Fischer-Tropsch gasoline, kerosene, heating oil, marine diesel, crude oil and derivatives thereof, or renewable raw materials such as biodiesel or vegetable oil. The hydrophilic component A is composed of water, mono- and polyhydric alcohols, peroxides and/or corresponding mixtures. Hydrophobic component B and hydrophilic component A are miscible with one another in any desired ratio. The mixtures are designed such that, with an extremely short mixing time and without any great energy input, ultrafine distribution of the hydrophobic and hydrophilic components is achieved. The choice of the amphiphilic component C is important. Amphiphiles are selected such that, within the desired temperature range (for example, operating temperature of the injection system of approximately (80±10)° C.), the interfacial tension between hydrophobic and hydrophilic components is lowered to a minimum. A microemulsion or emulsion can be formed according to the molecular structure and concentration of the amphiphile. From this point of view, the present invention is universal. Depending on the demands on the exhaust gas values, the amount of the amphiphilic component can be reduced to a minimum (e.g., <0.05% by weight based on the total amount). The amphiphilic component C and auxiliary component D are selected from substances which are combustible ashlessly, i.e., consist of elements C (carbon), H (hydrogen), O (oxygen) and N (nitrogen). The mixtures may also comprise any additives which may be combustion-accelerating, catalytically active, biocidal, freezing point-depressing, viscosity-modifying, conductivity-modifying, antistatic substances. The production of the mixture in the high-pressure region of the injection system no earlier than 10 seconds or shortly prior to the actual injection allows for the immediate reaction of the mixing system to a change in load. The proportion of the hydrophilic component in the fuel is varied according to the change in load as required, and the combustion operation is optimized with regard to pollutant emission and fuel consumption.

Figure 3:
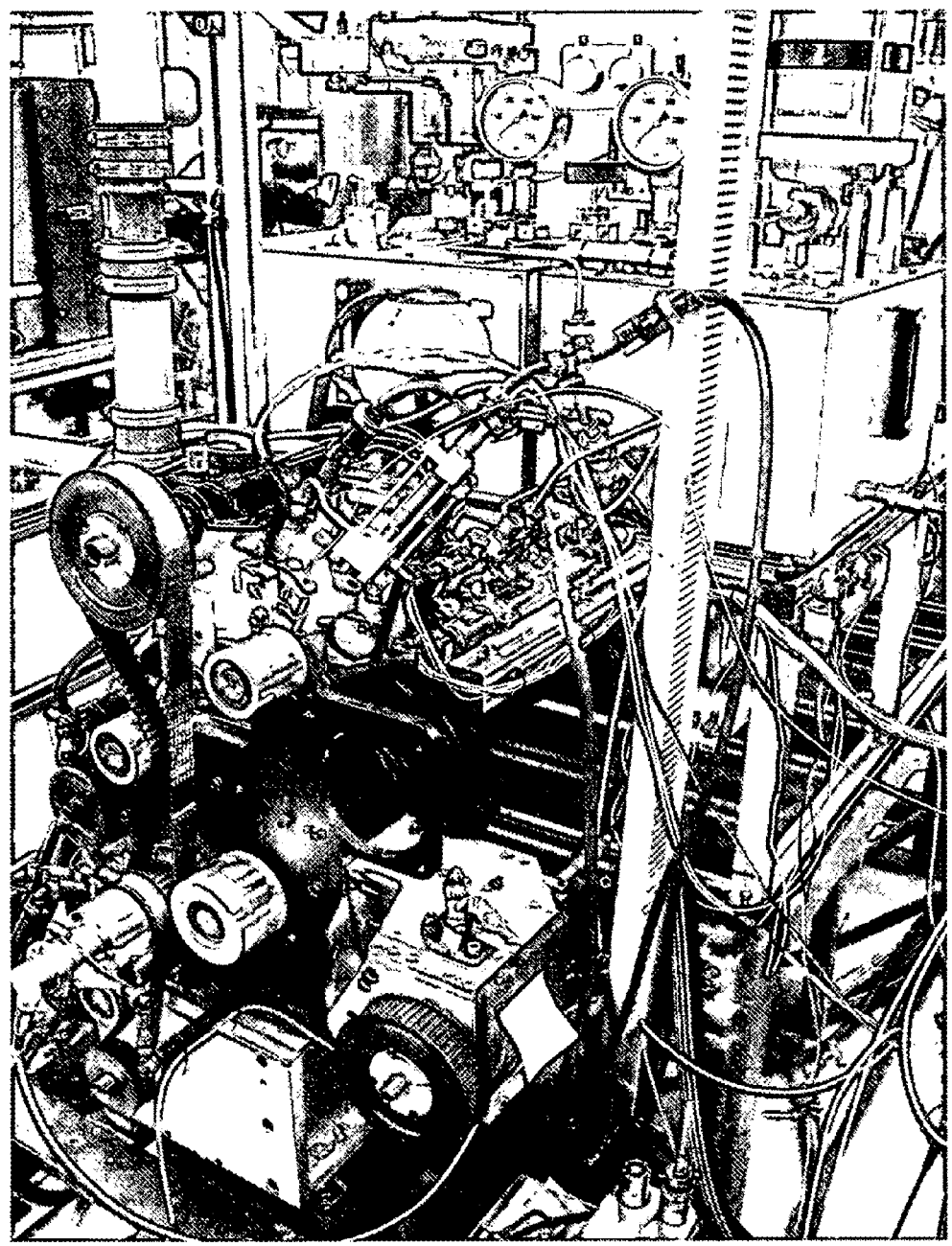
FIG. 3: shows an injection system on a single-cylinder research engine.

Movement of the mixing chamber directly to the injection nozzle of the engine can reduce the dead time between emulsion and/or microemulsion formation and provision in the injector to a minimum degree ("on-injector mixing"). Thus, in the event of a change in load of the engine, the "new" mixture is available virtually immediately after only a few milliseconds (ms). This aspect was pursued in the development of a new injection system (FIG. 1 and FIG. 3).

Figure 2:
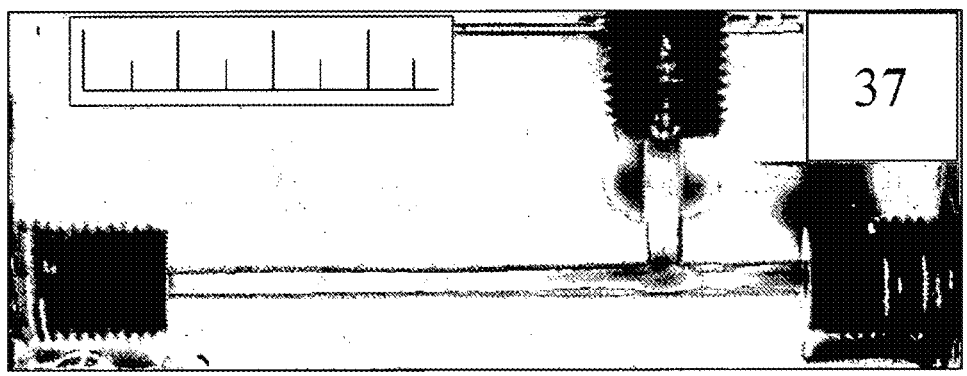
FIG. 2: shows a homogeneous diesel/water mixture.

The prerequisite for this aspect, however, is the spontaneous formation of a homogeneous diesel/water mixture. In order to be able to study this possibility and also undertake optimization of the mixing chamber geometry, an appropriate low-pressure model injection test bed with exchangeable mixing chamber was first built. This test bed was used to conduct numerous fundamental flow tests. As evident from FIG. 2, addition of a surfactant, even after a flow distance of about 1 cm, results in formation of a homogeneous mixture of diesel and water.

In parallel with these experimental preliminary tests, the flow and mixing characteristics of diesel and water in the mixing chamber were additionally studied by extensive CFD simulations. This also applies more particularly to the high-pressure test bed described hereinafter.

The high-pressure test bed consisted of two high-pressure pumps for diesel and water (maximum pressure up to 2000 bar), two rails, likewise for diesel and water, a mixing chamber which was mounted immediately upstream of the injection nozzle of the engine, and a second injector for water injection into the mixing chamber.

On completion of these very extensive fundamental studies, the construction of the high-pressure test bed was altered such that the hydraulic components installed on this test bed were usable in an unchanged manner on the single-cylinder research engine, as shown in FIG. 3.

The fuel was conveyed by the high-pressure pump through a pressure reservoir to the diesel rail and then through the mixing chamber to the injection nozzle. The injection nozzle used was a commercial piezo injector. The injector enabled five injections per operating cycle. The main injector (diesel injector), like the entire engine control, was actuated by means of correspondingly high-performance electronics.

The water was metered in through an injector of identical design to the diesel injection, except that the original nozzle body was replaced by one having only one central bore at the nozzle tip. As was already the case for the diesel conveying, the water was conveyed by the high-pressure pump, but now directly to the water rail and thence to the water injector. The water injector was connected to the mixing chamber by means of a tensioning system developed in-house. It order to prevent raising of the water nozzle needle during the fuel injection, which would result in overflow of diesel into the water injector, it is particularly advantageous when the water pressure is slightly above the fuel pressure.

This injector was actuated with the same control electronics as for the diesel injector. This control system enabled continuous or optionally intermittent water injection into the mixing chamber. The amount of water was controlled via the injection time.

The original plan was to inject the water directly into the fuel channel of the diesel injector, but it was necessary to depart from this due to restricted space conditions in the single-cylinder research engine. Instead, a mixing chamber was mounted immediately upstream of the diesel injector. The mixing chamber consisted of stainless steel and was designed for pressures of well above 2000 bar. Transverse to the main flow direction, the water injector injects the water into the mixing chamber (see FIG. 3).

After extensive proof of function with pure diesel operation, water was subsequently injected into the mixing chamber. The water content in the fuel was initially varied at an injection pressure of 500 bar and in-line injection time.

Figure 4:
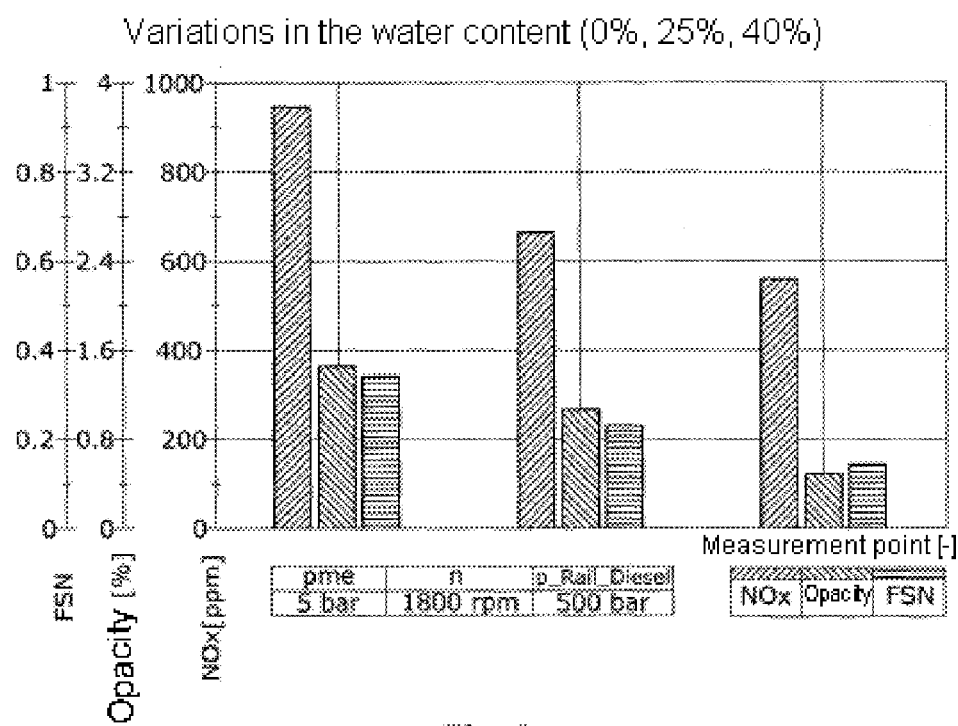
FIG. 4: shows a decrease in soot and NOx in emulsion operation compared to pure diesel operation.

As FIG. 4 shows, soot loading decreased visibly with increasing water content. Compared to pure diesel operation (measurement point 1), the soot decrease (FSN and opacity) at a water content of approximately 25% (based on the amount of fuel) is about 34%. At the same time, the nitrogen oxide concentration likewise decreased by approximately 30% (measurement point 2).

At a water content of approximately 40% (measurement point 3), the soot loading was reduced by almost 60% and the NOx concentration by approximately 40% compared to diesel operation.

Since the diesel/water emulsions were produced without addition of a surfactant in the aforementioned measurements, a further improvement in the mixing characteristics is expected with the addition of a surfactant, which is probably associated with an even greater lowering of the soot and NOx concentration.

By way of example, for diesel fuel, the most favorable water content for each of the 13 operating points (13-point test) was determined, at which the combustion proceeds optimally with regard to the emission of the uncombusted hydrocarbons, nitrogen oxides, soot and the specific fuel consumption. The optimal water concentrations may differ by up to 30% according to the operating point (for example, starting the engine with pure fuel and operation in the moderate full-load range with 27% water in the fuel). This requires a minimal reaction time of the metering system. Such a reaction time can be achieved only when the mixture is produced shortly before or during the injection operation. The present invention is therefore based on the movement of the mixing site as close as possible to the injection nozzle in the high-pressure region of the injection system, and on the shortening of the mixing time to the minimum, and no earlier than 10 seconds before commencement of injection. With minimal surfactant use, the present invention provided optimal fine distribution of the fuel and of the water within a very short mixing time in the high-pressure region of the injection system for any water-fuel ratio. This distinguishes the mixtures of the present invention and the production thereof from existing formulations and mixing units. The present invention provides guidance for additional technical action, here the formulation, optimization, production and use of novel mixtures, and for the adjustment of the emulsifiers and injection systems.

Figure 5:
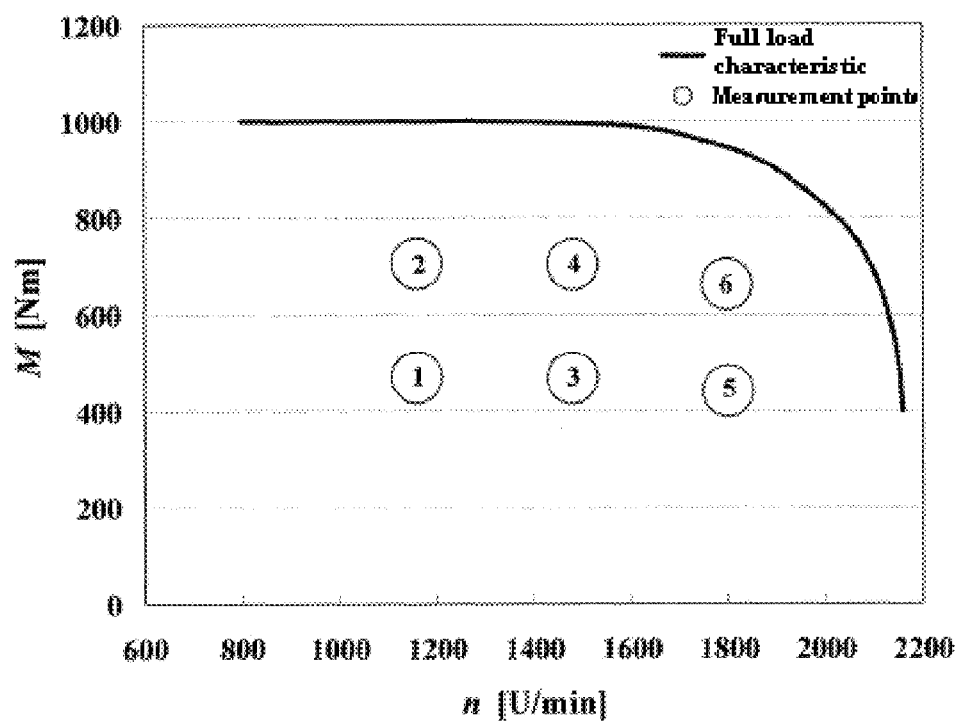
FIG. 5: shows a line representing the full-load characteristic of the MAN engine, and circles representing the operating points used for the tests.
Figure 6:
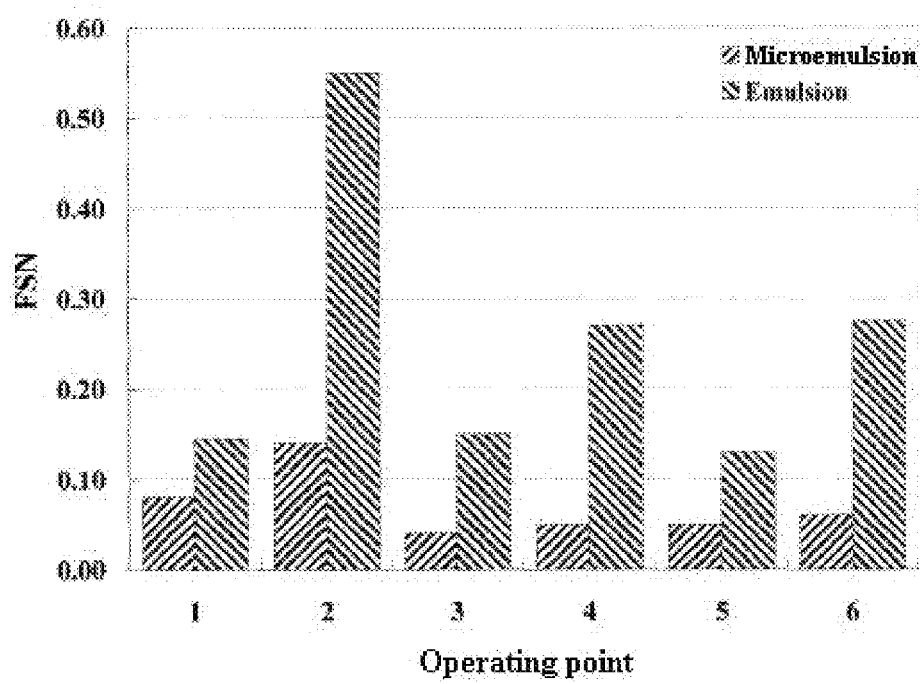
FIG. 6: shows a comparison of soot emissions (measured as FSN) in microemulsion or emulsion operation as a function of operating point.
Figure 7:
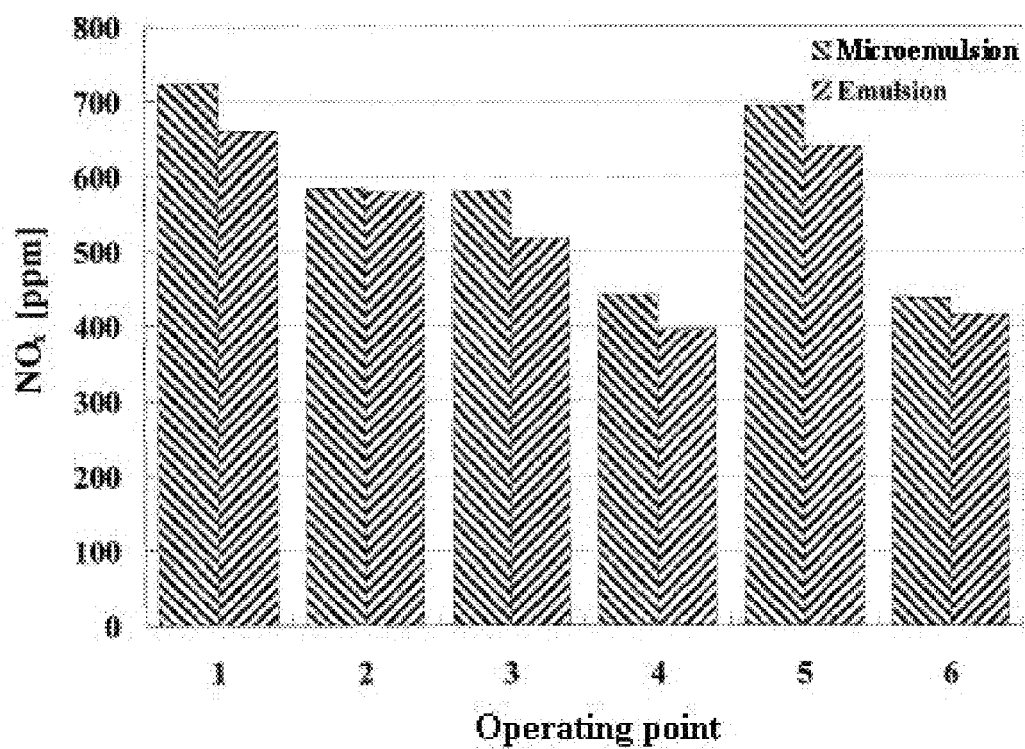
FIG. 7: shows a comparison of the $NO_x$ emissions in microemulsion or emulsion operation as a function of operating point.

There have been several reports about the positive influence of water on in-engine combustion. In this context, the distribution form of the water and fuel plays a crucial role. The more closely the water and fuel regions are present alongside one another in the mixture to be injected, and later in the course of jet spreading and evaporation in the combustion chamber, the greater is the reduction in pollutant emissions (FIG. 6 and FIG. 7). Microemulsified and emulsified fuels were compared in the examples described herein. The MAN commercial vehicle diesel engine used (FIG. 5) is a direct injection, ATL-charged five-cylinder diesel engine equipped with charge air cooling, with a maximum power of 191 kW at 2000 min$^{-1}$ and a maximum torque of 1050 Nm between 1000 and 1500 min$^{-1}$. The fuel was injected by means of an electronically regulated in-line injection pump.

Further technical data are as follows:

| Capacity | $V_H$ = 9973 cm$^3$ |
|---|---|
| Cylinder diameter | D = 128 mm |
| Stroke | S = 155 mm |
| Compression ratio | ε = 17 |

For the studies, the concentration for the microemulsion was produced on the basis of the H$_2$O/ethanol-diesel (Aral)-NH$_4$ oleate/oleic acid (65% neutr.)/TEGO® SMO V system, with ψ=0.30; δ=0.67; α=0.61 (≙% by weight of H$_2$O 21-22) and corresponding γ value γ=0.20. The emulsion was achieved with the hydrophobic emulsifier TEGO® SMO V (Sorbitan monooleate) (0.5% by weight in the diesel fuel) present in the microemulsion fuel. In both cases, diesel-containing concentrates were produced, with the aim of improving the flowability of the emulsifier mixture for the microemulsion and of the emulsifier for the emulsion. The concentrates were added to the diesel fuel in the mixing ratio specified. Ethanol for the microemulsion production was added to the water.

For the complete optimization of engine operation exploiting the pollutant-reducing effect of the water, water must be metered in as a function of operating point. The problems which arise here are based on the reaction time of the water metering and addition, which must be in the region of a few milliseconds to be able to correspond to the rapid change in load. Maximum fine distribution of the water in the fuel must be achieved within a few milliseconds. Millisecond-accurate metered addition of the water can thus be achieved only in the high-pressure region of the injection system, as close as possible to the injection nozzle or in the injection nozzle.

Laminar flows typically exist in the high-pressure region of the injection system of a direct injection internal combustion engine. A small amount of the fuel is compressed by a high-pressure pump to a pressure dependent on the engine and injection system type, and injected, some of the fuel being used as fuel for the combustion and some as a lubricant and hydraulic fluid for the injection nozzle. The leakage which arises here is fed into the low-pressure region and conveyed repeatedly through the high-pressure pump. In the case of a piezo injector, the leakage is dispensed with. An optimal arrangement of the water supply with exploitation of the static pressure drop at low pressure differences in fuel and water lines can give rise to local turbulent flow which, at the macroscopic level, produces vortexing of the water and fuel streams. At the microscopic level, the interfacial tension between water and fuel must be lowered to a value range of from 10$^{-6}$ to 10$^{-1}$ mN/m in order to enable fine distribution of the water in the fuel within a very short time. Only in such an energetically favorable state can a domain size in the nanometer to micrometer range be achieved. These low values of interfacial tension between two liquids immiscible in principle, such as water and fuel, can be achieved by the addition of amphiphiles (surfactants). The amphiphiles are chosen according to particular criteria and adapted to the particular system (depending on the chemical composition and the desired temperature level). The amphiphilic component (C) can be added in the later use to the fuel (to the hydrophobic component (B)), forming a monophasic solution and slightly influencing the characteristics of the fuel (viscosity, freezing and boiling temperatures, cetane or octane number, ignitability). Since the amphiphiles usually contain oxygen atoms in the molecular structure, the oxygen-carbon ratio in the fuel changes, which can already lead to a reduction in soot emissions, similarly to the case of biodiesel. The amphiphilic component (C) can additionally be carried in an extra tank, which gives rise to the greatest savings in the mass of component (C), since the metered addition is coupled to the metered addition of the hydrophilic component (A). The amphiphilic component (C) can also be added to the hydrophilic component (A). In the case of recovery of the water from the combustion reaction by condensation of the exhaust gas, it is advisable to add the amphiphilic component to the fuel and to dispense with the installation of an extra tank. There follows a description of the compositions of the systems which can be used for the production of the mixture of a polar component A, a nonpolar component B and an amphiphilic component C and an auxiliary component D in the high-pressure region of the injection system, which can also be utilized as a fuel.

DEFINITIONS

There follows a list of the parameters needed for understanding of the phase diagrams shown.

$$\alpha = \frac{m_B}{m_B + m_A}$$

where index B denotes the hydrophobic component (B) and index A the hydrophilic component A), and $m$, denotes the mass of a substance.

$$\gamma = \frac{m_C}{m_{total}}$$

where index C denotes the amphiphilic component (C).

$$\delta_{C,i} = \frac{m_{C,i}}{\sum m_{C,i}}$$

gives the proportion by mass of an amphiphilic substance in the total mass of the amphiphilic component C.

$$\psi = \frac{m_{alcohol}}{m_A}$$

gives the proportion by mass of an alcohol in the hydrophilic component (A).

$$\varepsilon_{salt,i} = \frac{m_{salt,i}}{m_A}$$

gives the proportion by mass of a salt in the hydrophilic component (A).

The composition of the mixtures is reported in percent by weight:

$$\% \text{ by wt.} = \frac{m_i}{\sum_i m_i} 100\%$$

Remarks Regarding Production a) Mixtures, Emulsions

For the production of an emulsion, the surfactant requirement is lower than for the production of a microemulsion. Depending on the surfactant structure and operating temperature, w/o (water in fuel) or o/w (fuel in water) emulsions are produced, which differ in the dispersed and continuous phases.

b) Mixtures, Triphasic Mixtures with a Bicontinuous Phase

Figure 8:
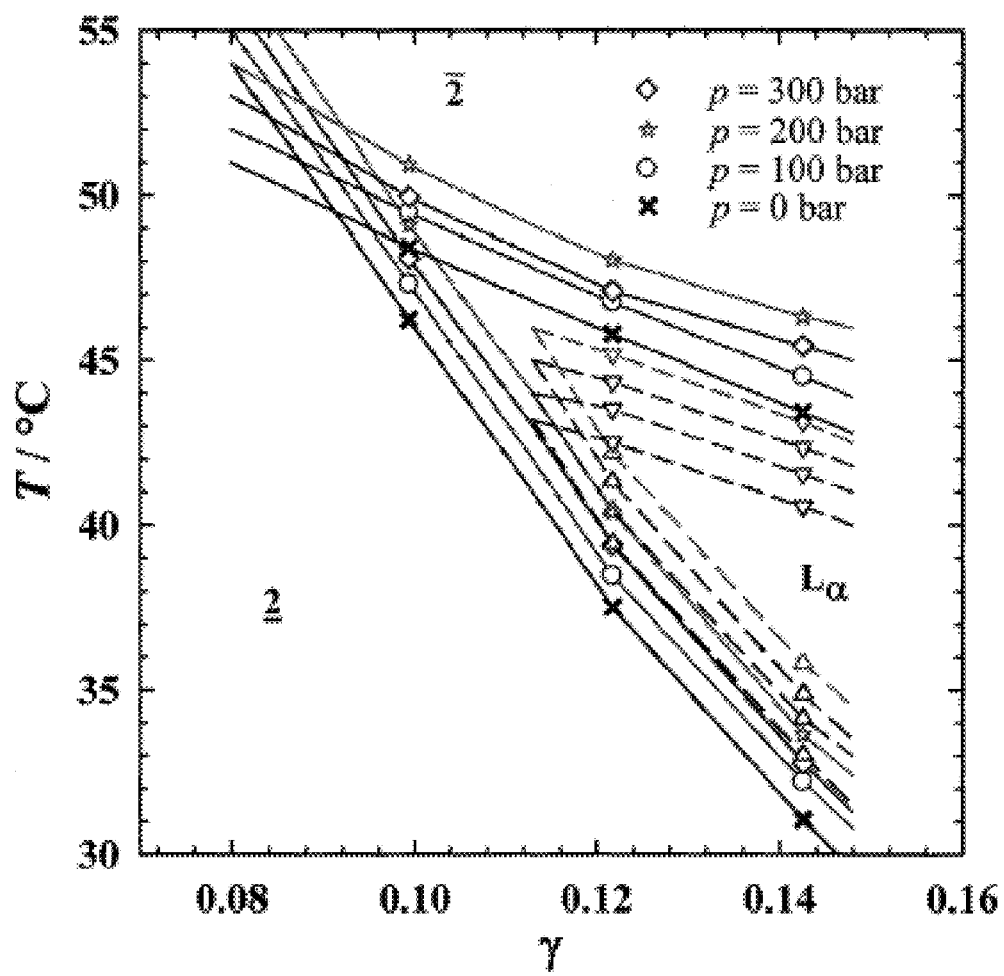
FIG. 8: shows a $H_2O$-diesel-Lutensol® TO 5 system with $\alpha=0.50$, variation of pressure.

Production of triphasic mixtures requires knowledge of the boundary parameters, as in the case of the microemulsion. The composition is selected such that a three-phase region is present in the phase diagram at the operating temperature and pressure of the injection system/engine. The surfactant requirement is likewise lower than for the production of a microemulsion, the interfacial tension between water and fuel being lowered to a minimum, which enables fine distribution of the water and fuel regions.

c) Mixtures, Microemulsions:

For the production of a microemulsion (or of a triphasic mixture with a bicontinuous phase) in the high-pressure region of the injection system, knowledge of the boundary parameters is required. In the engine environment, the operating temperature is approximately 80° C. Assuming that only the amount of the water-containing fuel which is utilized for combustion is produced, and the return stream is circulated, the temperature invariance of the microemulsion assumes a minor role. The system must have a one-phase area within a temperature range of T=(80±10)° C. and be efficient. A further parameter which must be taken into account for the formulation is the pressure. Altering the pressure influences the phase behavior of complex fluids. For the case of a microemulsion, the influence of pressure was tested using the example of a ternary system (FIG. 8). For every 100 bar, the phase boundaries of a microemulsion system or of an ionic microemulsion system (Kahlweit, M. et al., General Patterns of the Phase-Behavior of Mixtures of $H_2O$, Nonpolar-Solvents, Amphiphiles, and Electrolytes .2., Langmuir, 5(2): p. 305-315 (1989)) (nonionic phase sequence: $\underline{2} \to 1 \to \overline{2}$, ionic phase sequence: $\overline{2} \to 1 \to \underline{2}$) with diesel fuel are shifted by $\Delta T=1°$ C. to higher temperature values; the efficiency of the system remains unchanged. In present day injection systems, injection pressures of 1000 to 2500 bar are generated. The final formulation of the microemulsion is to be selected such that, for example, the one-phase area at atmospheric pressure is correspondingly lower with regard to the temperature axis.

There follow examples of the mixtures which are designed, in the case of a triphasic mixture or of a microemulsion, for an operating temperature of 80° C. and the operating pressure of 2000 bar. The minor alteration to the surfactant mixture allows the formulations to be adapted without any problem to other conditions, especially temperature or pressure.

EXAMPLES

Example 1

Figure 9:
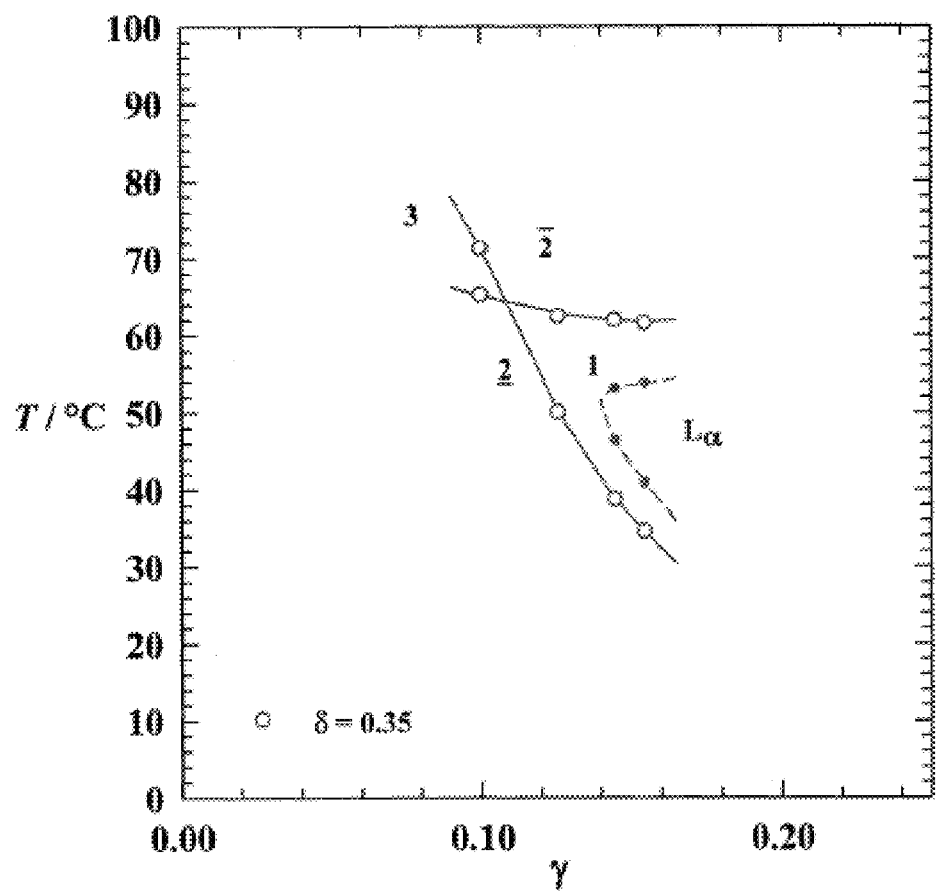
FIG. 9: shows a $H_2O$-diesel-Lutensol® TO 5/APG 264-G system with $\alpha=0.50$.

$H_2O$-diesel-Lutensol®TO5/APG 264-G system (FIG. 9) with $\delta=0.35$ and $\alpha=0.50$, with the fishtail point at $\tilde{T}=64.2°$ C. and $\tilde{\gamma}=0.108$. The industrial surfactant Lutensol®TO5 corresponds in structural terms to pure $C_{12-14}E_5$. The industrial surfactant Agnique APG 246-G is a technical equivalent of pure n-decyl-b-D-glucopyranoside $C_{10}G_1$, the maximum of the distribution of the length of the carbon chain and glycose units corresponding to the overall formula $C_{10-12}G_{1,4}$.

a) Emulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| $C_{12-14}E_5$ | 1.30-2.60 | 1.62-2.28 | 1.82-2.08 |
| $C_{10-12}G_{1,4}$ | 0.70-1.40 | 0.88-1.23 | 0.98-1.12 |
| A: Hydrophilic component | | | |
| Water (distilled) | 3.00-50.00 | 3.00-50.00 | 3.00-50.00 | c) Microemulsion T=(80±5)° C.:

| Component | % by wt. | % by wt. (preferred) | % by wt. (esp. preferred) |
|---|---|---|---|
| B: Hydrophobic component | | | |
| Diesel | 90.00-50.00 | 90.00-55.00 | 90.00-60.00 |
| C: Amphiphilic component | | | |
| $C_{12-14}E_5$ | 7.47-9.25 | 7.67-9.10 | 7.80-8.45 |
| $C_{10-12}G_{1,4}$ | 4.03-5.25 | 4.13-4.90 | 4.20-4.55 |
| A: Hydrophilic component | | | |
| Water (distilled) | 3.00-50.00 | 3.00-50.00 | 3.00-50.00 |

Example 2

Figure 10:
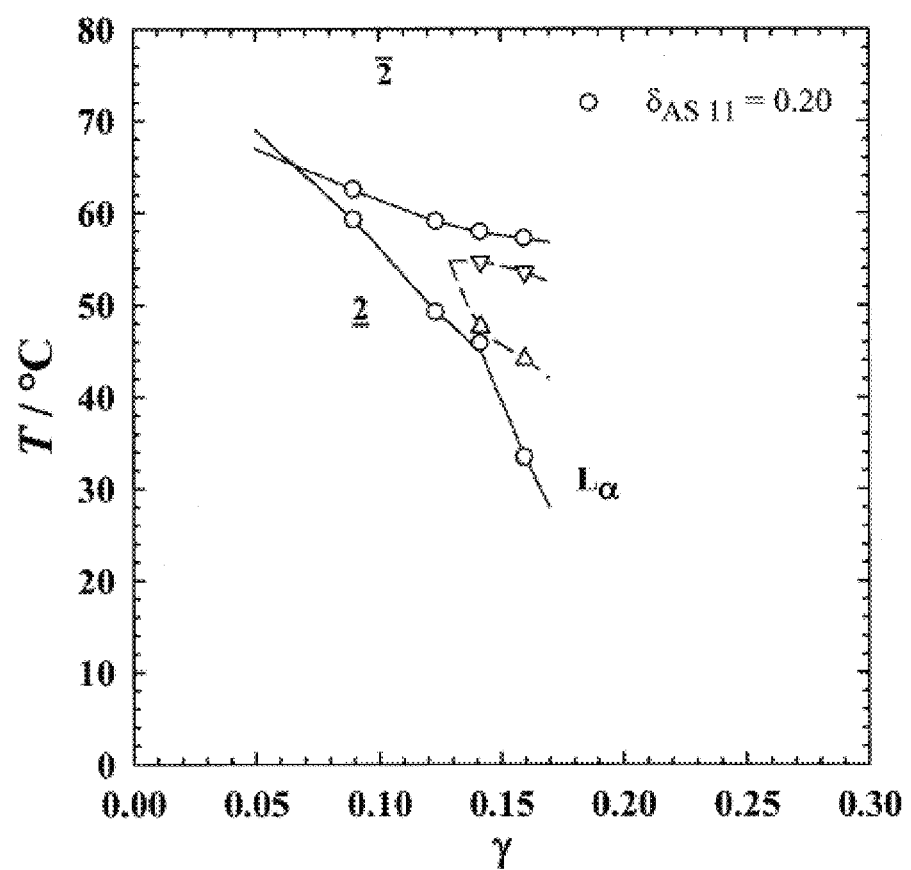
FIG. 10: shows a $H_2O$-diesel (Aral)-Lutensol® TO 5/AS 11 system with $\alpha=0.50$ and $\delta=20$.

$H_2O$-diesel-Lutensol® TO5/AS 11 system (FIG. 10) with $\tilde{\delta}=0.20$ and $\alpha=0.50$, with the fishtail point at $\tilde{T}=65.5°$ C. and $\tilde{\gamma}=0.068$. The industrial surfactant Lutensol® TO5 corresponds in structural terms to pure $C_{12-14}E_5$. The industrial surfactant Emuldac® AS 11 corresponds in structural terms to pure $C_{16-18}E_{11}$.

a) Emulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| $C_{12-14}E_5$ | 1.60-3.20 | 2.00-2.80 | 2.24-2.56 |
| $C_{16-18}E_{11}$ | 0.40-0.80 | 0.50-0.70 | 0.56-0.64 |
| A: Hydrophilic component | | | |
| Water (distilled) | 3.00-50.00 | 3.00-50.00 | 3.00-50.00 | c) Microemulsion T=(80±5)° C.:

| Component | % by wt. | % by wt. (preferred) | % by wt. (esp. preferred) |
|---|---|---|---|
| B: Hydrophobic component | | | |
| Diesel | 90.00-50.00 | 90.00-55.00 | 90.00-60.00 |
| C: Amphiphilic component | | | |
| $C_{12-14}E_5$ | 7.20-11.20 | 9.60-10.40 | 8.00-9.60 |
| $C_{16-18}E_{11}$ | 1.80-2.80 | 1.90-2.60 | 2.00-2.40 |
| A: Hydrophilic component | | | |
| Water (distilled) | 3.00-50.00 | 3.00-50.00 | 3.00-50.00 |

Example 3

Figure 11:
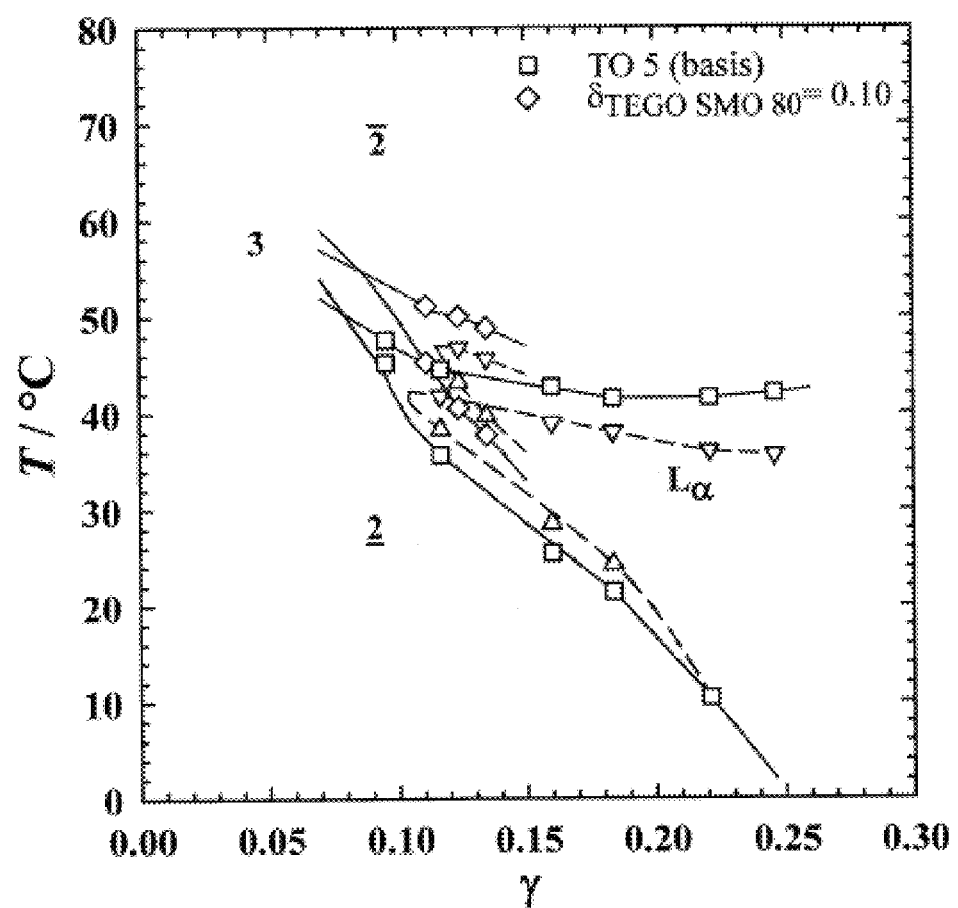
FIG. 11: shows phase characteristics of the standard $H_2O$-diesel (Aral)-Lutensol® TO 5/TEGO® SMO 80 V system with $\alpha=0.50$ and $\delta=0.00/0.10$.

$H_2O$-diesel-Lutensol® TO5 system and $\alpha=0.50$ (FIG. 11). The industrial surfactant Lutensol® TO5 corresponds in structural terms to pure $C_{12-14}E_5$.

a) Emulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| $C_{12-14}E_5$ | 1.60-3.20 | 2.00-2.80 | 2.24-2.56 |
| A: Hydrophilic component | | | |
| Water (distilled) | 3.00-50.00 | 3.00-50.00 | 3.00-50.00 | b) Triphasic mixture with a bicontinuous phase T=(80±5)° C.:

| Component | % by wt. | % by wt. (preferred) | % by wt. (esp. preferred) |
|---|---|---|---|
| B: Hydrophobic component | | | |
| Diesel | 90.00-50.00 | 90.00-55.00 | 90.00-60.00 |
| C: Amphiphilic component | | | |
| $C_{12-14}E_5$ | 4.00-7.00 | 4.50-6.50 | 5.00-6.00 |
| A: Hydrophilic component | | | |
| Water (distilled) | 3.00-50.00 | 3.00-50.00 | 3.00-50.00 |

Example 4

$H_2O$-diesel-Lutensol® TO5/TEGO® SMO 80 V system with $\tilde{\delta}=0.10$ and $\alpha=0.50$. The industrial surfactant Lutensol® TO5 corresponds in structural terms to pure $C_{12-14}E_5$. The industrial surfactant TEGO® SMO 80 V is a sorbitan monooleate ester which is reacted with about 20 mol of ethylene oxide per mole of ester (Polysorbate 80).

a) Emulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| $C_{12-14}E_5$ | 1.90-3.60 | 2.25-3.15 | 2.52-2.70 |
| Polysorbate 80 | 0.10-0.60 | 0.25-0.35 | 0.28-0.30 |
| A: Hydrophilic component | | | |
| Water (distilled) | 3.00-50.00 | 3.00-50.00 | 3.00-50.00 | b) Triphasic mixture with a bicontinuous phase T=(80±5)° C.:

| Component | % by wt. | % by wt. (preferred) | % by wt. (esp. preferred) |
|---|---|---|---|
| B: Hydrophobic component | | | |
| Diesel | 90.00-50.00 | 90.00-55.00 | 90.00-60.00 |
| C: Amphiphilic component | | | |
| $C_{12-14}E_5$ | 3.60-6.30 | 4.05-5.95 | 4.50-5.40 |
| Polysorbate 80 | 0.40-0.70 | 0.45-0.65 | 0.50-0.60 |
| A: Hydrophilic component | | | |
| Water (distilled) | 3.00-50.00 | 3.00-50.00 | 3.00-50.00 |

Example 5

Figure 12:
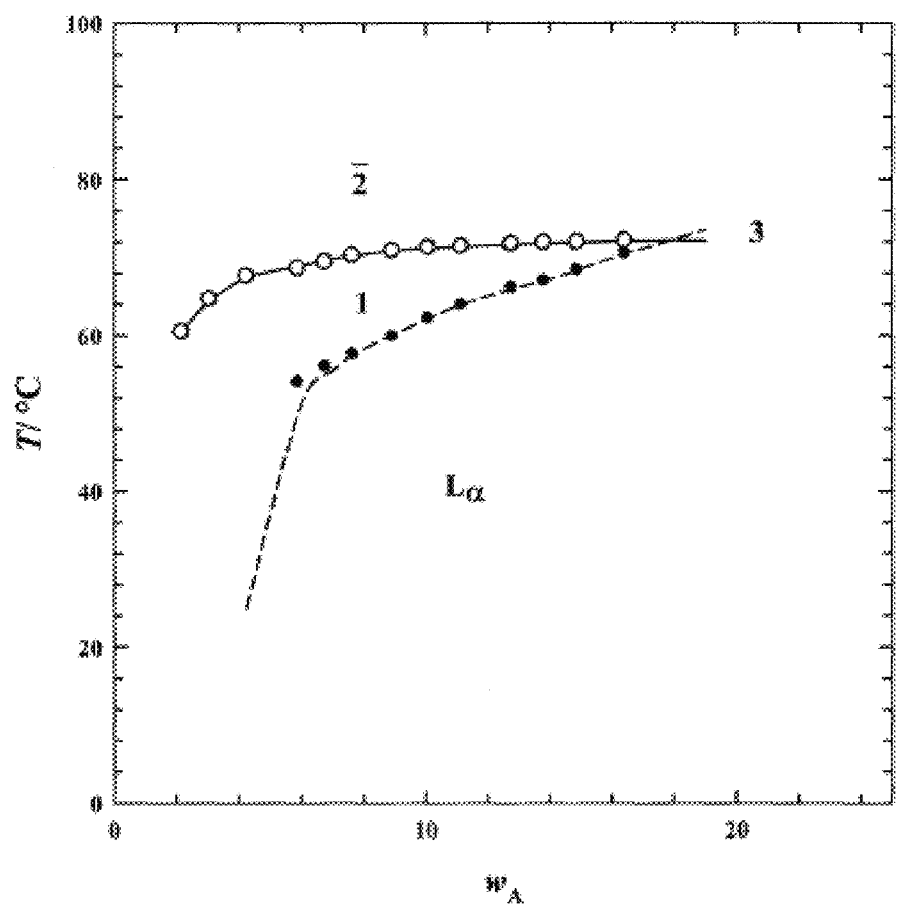
FIG. 12: shows a system comprising the comprising the oily component diesel-TO 5/Marlipal 1618/11/APG264-G/Edenor K12-18 with $w_{C,b}=0.11$, $\delta_{Marlipal,b}=0.14$, $\delta_{Edenor,b}=0.55$, $\delta_{APG,b}=0.05$, 0.48% by weight of $NH_4OAc$ and the aqueous component $H_2O$/ethanol-TO 5/APG264-G/Edenor K12-18 with $w_{C,a}=0.094$, $\psi=0.10$, $\delta_{Edenor,a}=0.30$, $\delta_{APG,a}=0.25$.

H$_2$O/ethanol/NH$_4$OAc-diesel-TO 5/APG264-G/Marlipal 1618/11/Edenor K12-18 system (FIG. 12) was separated into an aqueous and an oily component. The composition of the oily component: diesel-TO 5/Marlipal 1618/11/APG264-G/Edenor K12-18 with $\gamma_B$=0.11, $\delta_{Marlipal,b}$32 0.14, $\delta_{Edenor,b}$=0.55, $\delta_{APG,b}$=0.05, 0.48% by weight of NH$_4$OAc, and the aqueous component: H$_2$O/ethanol-TO 5/APG264-G/Edenor K12-18 with $\gamma_A$=0.094, $\psi$=0.10, $\delta_{Edenor,a}$=0.30, $\delta_{APG,a}$=0.25. Edenor K12-18 is a fatty acid mixture with average length of the carbon chain of 12 to 18 carbon atoms. Marlipal 1618/11 corresponds in structural terms to the pure alkyl polyglycol ether C$_{16-18}$E$_{11}$.

a) Emulsion

| Component | % by wt. | % by wt. (preferred) | % by wt. (esp. preferred) |
|---|---|---|---|
| B: Hydrophobic component | | | |
| Diesel | 90.00-50.00 | 90.00-55.00 | 90.00-60.00 |
| C: Amphiphilic component | | | |
| C$_{12-14}$E$_5$ | 0.58-1.16 | 0.73-1.02 | 0.81-0.93 |
| Polysorbate 80 | 0.20-0.40 | 0.25-0.35 | 0.28-0.32 |
| C$_{16-18}$E$_{11}$ | 0.23-0.45 | 0.28-0.40 | 0.32-0.36 |
| D: Auxiliary component | | | |
| Fatty acid mixture C$_{12-18}$ | 1.01-2.02 | 1.26-1.76 | 1.41-1.61 |
| A: Hydrophilic component | | | |
| Ethanol | 0.30-15.00 | 0.30-15.00 | 0.30-15.00 |
| Water (distilled) | 2.70-50.00 | 2.70-50.00 | 2.70-50.00 | c) Microemulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| C$_{12-14}$E$_5$ | 2.32-4.66 | 2.91-4.37 | 3.49-4.07 |
| Polysorbate 80 | 0.79-1.58 | 0.99-1.49 | 1.19-1.39 |
| C$_{16-18}$E$_{11}$ | 0.91-1.81 | 1.13-1.70 | 1.36-1.58 |
| D: Auxiliary component | | | |
| Fatty acid mixture C$_{12-18}$ | 4.03-8.06 | 5.04-7.56 | 6.05-7.06 |
| A: Hydrophilic component | | | |
| Ethanol | 0.30-15.00 | 0.30-15.00 | 0.30-15.00 |
| Water (distilled) | 2.70-50.00 | 2.70-50.00 | 2.70-50.00 |
| NH$_4$OAc | 0.25-0.50 | 0.30-0.45 | 0.35-0.40 |

Figure 13:
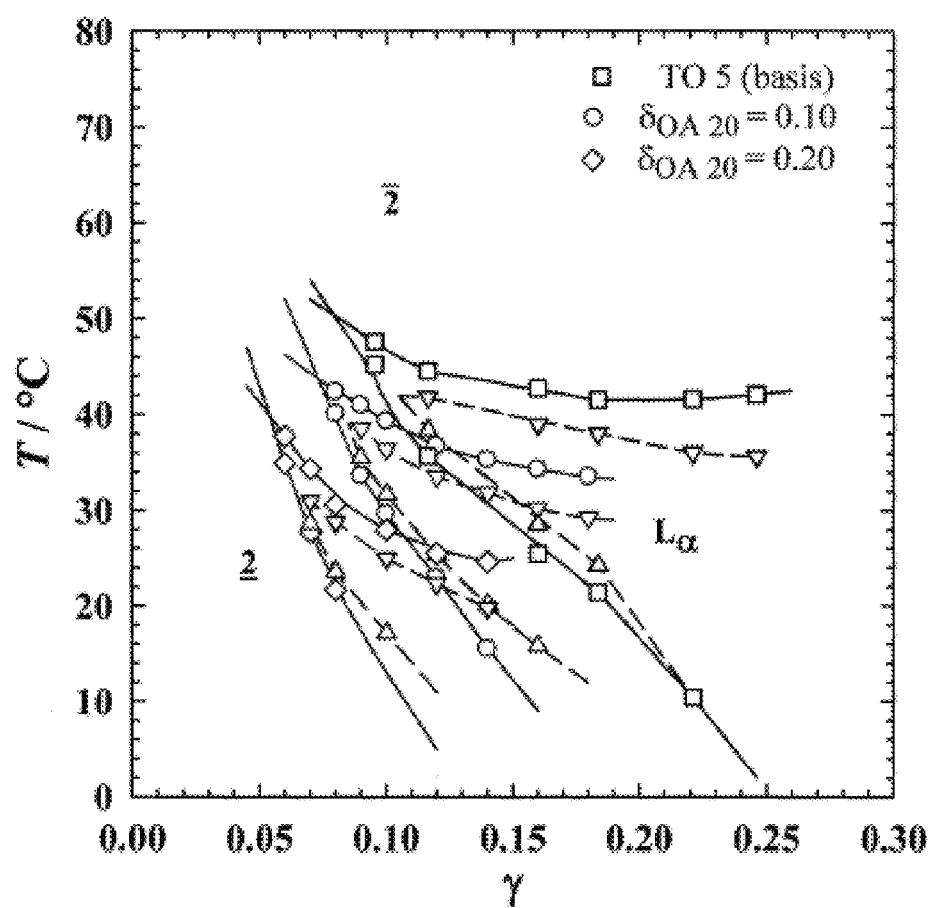
FIG. 13: shows a standard $H_2O$-diesel (Aral)-Lutensol® TO 5/Walloxen OA 20 system with $\alpha=0.50$ in a $\delta$ variation.
Figure 14:
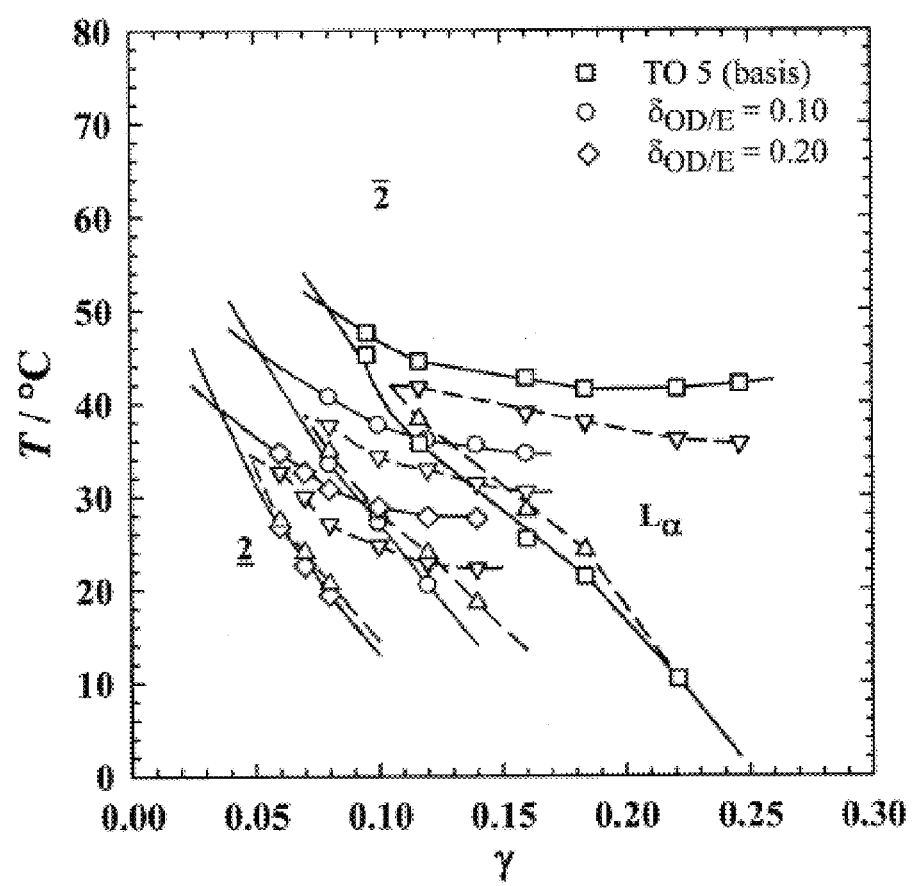
FIG. 14: shows a standard $H_2O$-diesel (Aral)-Lutensol® TO 5/Wallamid OD/E system with $\alpha=0.50$ in a $\delta$ variation.
Figure 15:
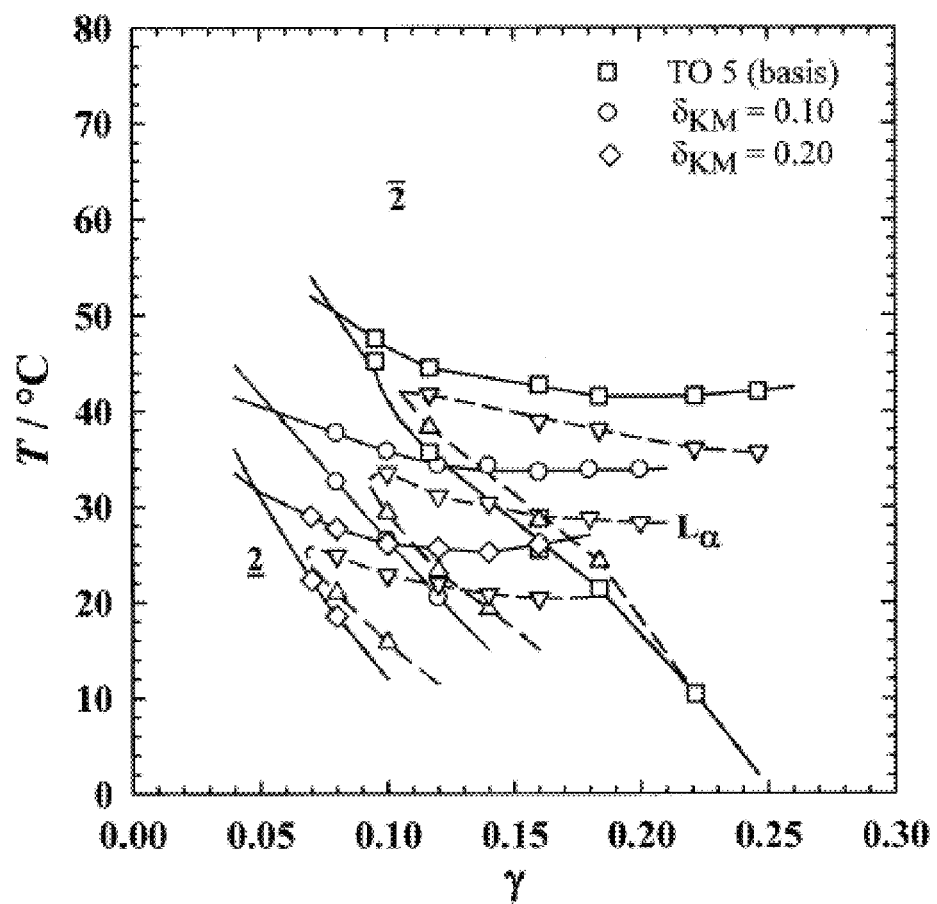
FIG. 15: shows a standard $H_2O$-diesel (Aral)-Lutensol® TO 5/Wallamid KM system with $\alpha=0.50$ in a $\delta$ variation.
Figure 16:
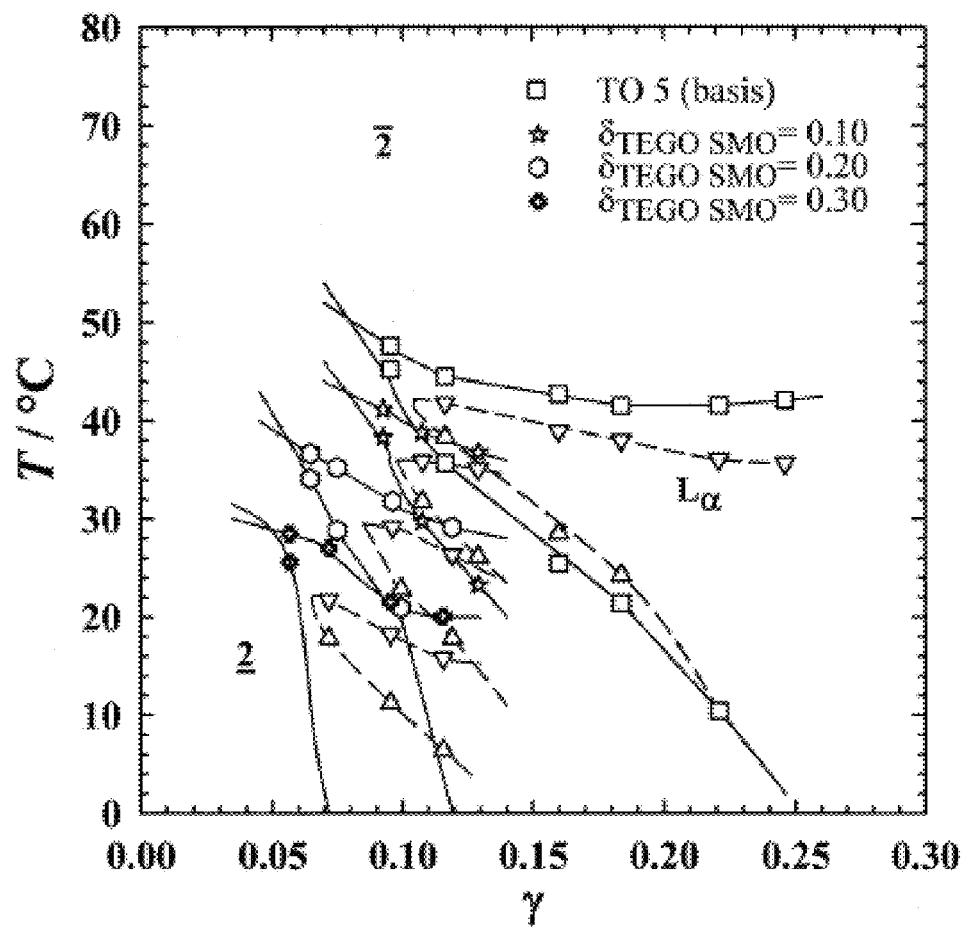
FIG. 16: shows a standard $H_2O$-diesel (Aral)-Lutensol® TO 5/TEGO® SMO V system with $\alpha=0.50$ in a $\delta$ variation.

Hydrophobic cosurfactants such as oleic acid diethanolamine (Walloxen OA 20, FIG. 13), oleic acid diethanolamide (Wallamid OD/E, FIG. 14), coconut fatty acid monoethanolamide (Wallamid KM, FIG. 15), sorbitan monooleate (FIG. 16), cause a shift in the phase boundaries of the H$_2$O-diesel-Lutensol® TO 5/cosurfactant system to lower temperatures. When such a cosurfactant is used as an emulsifier, a fine water-in-oil (diesel, fuel in general) emulsion can be formed.

Example 6

H$_2$O-diesel (Aral)-amphiphilic component (C) system with $\alpha$=0.50.

a) Emulsion:

| Component | % by wt. | % by wt. (preferred) | % by wt. (esp. preferred) |
|---|---|---|---|
| B: Hydrophobic component | | | |
| Diesel | 95.00-50.00 | 95.00-55.00 | 95.00-60.00 |
| C: Amphiphilic component | | | |
| C$_{12-14}$E$_5$ or oleic acid diethanolamine or oleic acid diethanolamide or coconut fatty acid monoethanolamide or sorbitan monooleate | 0.05-3.00 | 0.08-2.50 | 1.00-1.50 |
| A: Hydrophilic component | | | |
| Water (distilled) or water-alcohol mixture with any alcohol content | 3.00-50.00 | 3.00-50.00 | 3.00-50.00 |

The present invention is not limited to embodiments described herein; reference should be had to the appended claims.

What is claimed is:

1. A process for operating an internal combustion engine or a nozzle, the process comprising:
   producing a fuel-water mixture, the fuel-water mixture consisting of:
      a polar component A which includes at least water,
      a nonpolar fuel component B,
      an amphiphilic component C, and
      an auxiliary component D,
   in a high-pressure region of an injection system of an internal combustion engine or of a nozzle within 10 seconds of an injection operation; and
   injecting the fuel mixture into the internal combustion engine or the nozzle,
   wherein,
      a pressure is in a range of from 500 to 4,000 bar, and
      the nonpolar fuel component B is selected from at least one of diesel, Fischer-Tropsch diesel, heating oil, marine diesel, crude oil and derivatives thereof, and biodiesel.

2. The process as recited in claim 1, wherein the pressure is in a range of from 500 to 2,500 bar.

3. The process as recited in claim 1, wherein the polar component A is selected from at least one of an oxygen-containing molecule including water, mono- and a polyhydric alcohol, a water-soluble peroxide, and a water-soluble additive.

4. The process as recited in claim 3, wherein the water-soluble additive is a combustion-promoting salt.

5. The process as recited in claim 4, wherein the combustion-promoting salt is ammonium nitrate or a biocide.

6. The process as recited in claim 3, wherein the polyhydric alcohol includes ethanol, ethylene glycol and glycerol, and the water-soluble peroxide includes hydrogen peroxide and a percarbonate.

7. The process as recited in claim 1, wherein the amphiphilic component C is selected from at least one organic molecule which contains only C, H, O, N atoms and whose molecular structure has a polar and a nonpolar region.

8. The process as recited in claim 7, wherein the amphiphilic component C selected from at least one organic molecule which contains only C, H, O, N atoms and whose molecular structure has a polar and a nonpolar region is selected from:
nonionic surfactants,
ionic surfactants wherein a hydrophilic group consists of a surfactant ion and a counterion,
an amphoteric surfactant wherein a cation and an anion are joined by covalent bonds, and amphiphilic block copolymers.

9. The process as recited in claim 8, wherein the nonionic surfactants include fatty acids, polyalkoxylated fats, alkyl esters, alcohols and polysorbates, the ionic surfactants include ammonium salts and carboxylates, the amphoteric surfactant includes betaines, and the amphiphilic block copolymers include Pluronics and PEP-b-PEO.

10. The process as recited in claim 1, wherein the auxiliary component D is selected from at least one molecule which contains only C, H, O, N atoms.

11. The process as recited in claim 10, wherein the auxiliary component D selected from at least one molecule which contains only C, H, O, N atoms is selected from co-surfactants whose molecular structure has a polar and a nonpolar region.

12. The process as recited in claim 11, wherein the co-surfactants whose molecular structure has a polar and a nonpolar region include mono- or polyhydric alcohols having a carbon chain length of three or more carbon atoms in a hydrophobic molecular moiety, lubricants, anti-corrosives, ammonia, ethanolamine and other basic amines, urea, and a $NO_x$-reducing substance.

13. The process as recited in claim 1, wherein the fuel-water mixture consists of:
1 to 70 wt.-% of the polar component A,
40 to 99 wt.-% of the nonpolar fuel component B,
0 to 20 wt.-% of the amphiphilic component C, and
0 to 20 wt.-% of the auxiliary component D.

14. The process as recited in claim 1, wherein the fuel-water mixture consists of:
10 to 35 wt.-% of the polar component A,
60 to 95 wt.-% of the nonpolar fuel component B,
1 to 10 wt.-% of the amphiphilic component C, and
1 to 10 wt.-% of the auxiliary component D.

15. The process as recited in claim 1, wherein the producing of the fuel mixture is effected at a pressure of from 500 to 4,000 bar.

16. The process as recited in claim 1, wherein the producing of the fuel mixture is effected at a pressure of from 500 to 2,500 bar.

17. The process as recited in claim 1, wherein the fuel-water mixture is at least one of a water in fuel microemulsion, a water in fuel nanoemulsion, a water in fuel miniemulsion, a water in fuel emulsion, a bicontinuous microemulsion, a fuel in water microemulsion, a fuel in water nanoemulsion, a fuel in water miniemulsion, a fuel in water emulsion, a water in fuel in water emulsion, a fuel in water in fuel emulsion, and a triphasic mixture comprising a microemulsion phase.

18. The process as recited in claim 17, wherein the triphasic mixture has a bicontinuous microemulsion phase as one of its triphasic mixture.

19. The process as recited in claim 1, wherein an interfacial tension in the fuel mixture between the nonpolar fuel component B and the polar component A is from $10^{-6}$ to $10^{-10}$ mN/m.

20. The process as recited in claim 1, wherein the fuel-water mixture has an internal structure size of from 0.1 nm to 500 µm.

21. The process as recited in claim 1, further comprising:
adding the fuel-water mixture to a leakage oil mixture occurring in the injection system; and
circulating the fuel-water mixture added to the leakage oil mixture so as to again add the fuel-water mixture added to the leakage oil mixture to a new mixture as a proportion in a high pressure part of a fuel system.

22. The process as recited in claim 1, wherein water and uncombusted hydrocarbons condensed out of an exhaust gas of the internal combustion engine and recycled serve as portions of the polar component A and the nonpolar fuel component B.

* * * * *